United States Patent [19]

Wakiyama et al.

[11] Patent Number: 4,867,811
[45] Date of Patent: Sep. 19, 1989

[54] PROCESSES FOR PRODUCTION OF METALLIC CATALYST-CARRIER AND CATALYTIC COMPONENT

[75] Inventors: Hiroo Wakiyama; Hisashi Baba, both of Kitakyushu; Mikio Yamanaka; Keiichi Ohmura, both of Sagamihara; Shinichi Matsumoto, Aichi; Toshihiro Takada, Toyota; Shigetoshi Sugimoto, Aichi; Shinzi Shibata, Toyota; Toshiyuki Yashiro; Akihiko Kasahara, both of Tokyo, all of Japan

[73] Assignees: Nippon Steel Corporation, Tokyo; Toyota Jidosha Kabushiki Kaisha, Toyota; Nippon Kinzoku Co., Ltd., Tokyo, all of Japan

[21] Appl. No.: 225,068

[22] Filed: Jul. 27, 1988

[30] Foreign Application Priority Data

Jul. 27, 1987 [JP] Japan .................................. 62-185548
Oct. 30, 1987 [JP] Japan .................................. 62-273277

[51] Int. Cl.$^4$ .............................................. C23C 8/10
[52] U.S. Cl. ...................................... 148/277; 427/431
[58] Field of Search ................ 502/439; 427/431, 405; 148/227

[56] References Cited

U.S. PATENT DOCUMENTS 4,601,999 7/1986 Retallick et al. ..................... 502/314
4,675,214 6/1987 Kilbane et al. .
4,686,155 8/1987 Kilbane et al. .

FOREIGN PATENT DOCUMENTS 3440498 5/1985 Fed. Rep. of Germany .
50-66492 6/1975 Japan .
51-47157 12/1976 Japan .
52-126692 10/1977 Japan .
53-122693 10/1978 Japan .
54-97593 8/1979 Japan .
57-71898 5/1982 Japan .
58-1971 1/1983 Japan .
58-55815 12/1983 Japan .
62-11547 1/1987 Japan .
62-95142 5/1987 Japan .

*Primary Examiner*—Sam Silverberg
*Attorney, Agent, or Firm*—Kenyon & Kenyon

[57] ABSTRACT

A process for producing a metallic catalyst-carrier, comprising the steps of: preparing a steel sheet containing 9.0 to 25.0 wt % Cr and 0.01 to 6.0 wt % Al, plating the steel sheet with Ni at an amount of from 0.3 to 10.0 g/m$^2$, then plating with Al or Al-alloy at a plated amount defined by the formula;

$$\text{amount plated by hot dipping } (\mu m, \text{ for one side}) > T \times \dfrac{f\left(\dfrac{1780}{t} - Crb - 2a\right)}{G\left(4b + 2Crm - \dfrac{3560}{t}\right)},$$

and with a provision that the thickness of an Al-Fe alloyed layer is controlled to a thickness of 10 μm or less, cold rolling to a rolled thickness of 0.1 mm or less, working to a body of a required form, and heat-treating the body.

13 Claims, 5 Drawing Sheets (NOTE)
UNIFORMITY INDEX
1 : COMPLETELY PLATED
2 : PARTIALLY UNPLATED
3 : 30% OR MORE UNPLATED
4 : UNPLATED ALLOYED LAYER THICKNESS (μm)

(NOTE)
  EXFOLIATION INDEX
    1 : NO EXFOLIATION
    2 : SPOT-LIKE EXFOLIATION
    3 : STREAK-LIKE EXFOLIATION
    4 : OVERALL EXFOLIATION

PROCESSES FOR PRODUCTION OF METALLIC CATALYST-CARRIER AND CATALYTIC COMPONENT

BACKGROUND OF THE INVENTION

1. Field of the Invention

The present invention relates to processes for the production of a metallic catalyst-carrier and a catalytic component for the decomposition of harmful gases contained in exhaust emissions.

2. Description of the Related Art

Many processes are known for producing a catalyst carrier for nullifying the harmful constituents contained in automobile exhaust emissions. Recent severe regulations for automobile exhaust emissions have led to demands for a catalyst carrier having a light weight, a higher efficiency, and an excellent durability. Ceramics have been used as a catalyst carrier from the viewpoint of the refractory property thereof, but most ceramics have a low durability and a low permeability to exhaust gas. To solve these problems, a metallic catalyst-carrier and a catalytic component using a metallic catalyst-carrier have been proposed. Namely, Japanese Examined Patent Publication (Kokoku) No. 58-1971 and Japanese Unexamined Patent Publication (Kokai) No. 57-71898 disclose processes in which base metals having specific compositions are used, and in the former, alumina is formed on the base metal surface, or in the latter, a whisker is formed on the surface. The former disclosure has a problem in that both the workability and productivity are poor when attempting to maximize the area in contact with exhaust gas, and the latter disclosure also has a problem of a poor heat resistance, i.e., it does not provide the required effect at temperatures higher than 900° C., due to a severe oxidation thereof.

Japanese Examined Patent Publication (Kokoku) No. 51-47157 discloses a process in which a base metal containing iron as a basic constituent is coated with Al and then heat-treated to form a rough surface layer composed mainly of iron and aluminum, to enable an easy carrying of the catalyst The thus formed compound of iron and aluminum is very hard and brittle, and thus many cracks occur therein during service at elevated temperatures, with the result that oxygen enters through these cracks and oxidizes the base metal to form an oxidized layer between the compound and the base metal, whereby the compound is exfoliated Further various processes are known for producing a metallic catalyst-carrier by coating a base metal mainly composed of iron with Al or Al-alloy, as disclosed, for example, in Japanese Unexamined Patent Publication (Kokai) Nos. 50-66492 and 54-97593. These Publications do not disclose a steel composition, and merely coating iron with Al provides a heat resistance only at temperatures up to 600 or 700° C. at maximum and cannot provide a heat resistance at the automobile exhaust gas temperature of from 900 to 1100° C. Japanese Examined Patent Publication (Kokoku) No. 58-55815 discloses a process in which JIS SUS304, 303, 316, or 430 stainless steel is plated with Al. This process has a problem in that Al-plating is difficult with usual plating techniques and a special treatment is required, and further, if the Al-plating is advantageously performed, this type of stainless steel merely has a heat resistance at temperatures up to 800° C.

Japanese Unexamined Patent Publication (Kokai) No. 62-95142 discloses a process in which a stainless steel foil is plated with Al to form a metallic catalyst carrier. The Al-plating of a foil results in a relatively higher amount of Al, and a subsequent diffusion treatment generates an intermetallic compound and causes embrittlement.

It is known that a steel sheet having a composition of iron and Cr and other additive metals can be used as a metallic catalyst-carrier, such as the 3 to 40% Cr, 1 to 10% Al, 0 to 5% Co, and 0 to 72% Ni disclosed in Japanese Unexamined Patent Publication (Kokai) No. 53-122693 or the 0 to 20% Cr, 0.5 to 12% Al, and 0 to 3% Y disclosed in Japanese Unexamined Patent Publication (Kokai) No. 52-126692. These compositions have a problem in that the addition of Y, Co or other expensive elements is required, or where these expensive elements are not required, an increased Al content for ensuring a high heat resistance causes a high hardness which makes rolling and working, etc., practically impossible.

Japanese Unexamined Patent Publication (Kokai) No. 62-11547 discloses a metallic catalyst-carrier using a foil produced by plating pure Al on a base metal of a ferritic alloy containing Cr and a small amount of Al, and then rolling the Al-plated base metal. The disclosed method for plating Al on such a base metal may leave non-plated portions, and thus the resulting catalyst carrier will suffer from local oxidation.

For a metallic catalyst-carrier, it is most important to provide a reduced flow resistance to emissions, an increased surface area, and a maximum amount carried of a catalyst, and to ensure the catalytic effect, and at the same time, to provide a long term durability under elevated temperatures and vibration, etc., to maintain the catalytic effect over a long period of service. The known compositions for a metallic catalyst-carrier able to maintain a good heat resistance contain high amounts of Cr and Al, and a material having such a composition has a high hardness and is too brittle to be worked into a net, a foil, or other forms for maximizing the catalytic effect, which makes it difficult to use such a material as a catalyst carrier and, in turn, as a catalytic component.

SUMMARY OF THE INVENTION

An object of the present invention is to provide a process for producing a metallic catalyst-carrier having an excellent heat-resistance and workability, and thus solve the problems of the known metallic catalyst-carrier.

Another object of the present invention is to provide a process for producing an efficient and inexpensive catalytic component in which a catalyst is carried by the above-mentioned metallic catalyst-carrier.

To achieve these objects according to the present invention, a steel sheet of a specific composition containing Cr and Al as basic elements is used as a base metal, which is very thinly plated with Ni and then plated with Al or Al-alloy by hot dipping, to form a uniform and highly adhesive plated layer, maintaining the total amount of Al contained in the steel sheet and the plated layer as well as controlling the thickness of an alloyed layer formed on the steel sheet, to enable a subsequent cold rolling and working such as a honeycomb working, the worked sheet being heat-treated in a non-oxidizing atmosphere to completely dissolve the plated Al into the sheet without a formation of intermetallic compounds by virtue of a controlled plated amount of Al during the earlier hot dipping.

A gist of the present invention is a process for producing a metallic catalyst-carrier, comprising the steps of:

preparing a steel sheet containing;
0.1 wt % or less C,
2.0 wt % or less Si,
2.0 wt % or less Mn,
9.0 to 25.0 wt % Cr,
0.01 to 6.0 wt % Al, and
the balance consisting of Fe and unavoidable impurities, plating the steel sheet with Ni at an amount of from 0.3 to 10.0 g/m² in terms of the plated amount for each side of the steel sheet, plating the Ni-plated sheet by hot dipping with Al or Al-alloy at a plated amount defined by the following formula;

$$\text{amount plated by hot dipping } (\mu m, \text{ for one side}) > T \times \frac{f\left(\frac{1780}{t} - Crb - 2a\right)}{G\left(4b + 2Crm - \frac{3560}{t}\right)},$$

where
T = thickness of a steel sheet to be plated, in $\mu$m,
t = thickness of a foil to be rolled from a plated sheet, in $\mu$m,
Crb = Cr content of a steel sheet to be plated, in wt %,
Crm = Cr content of a plating bath, in wt %,
a = Al content of a steel sheet to be plated, in wt %,
b = Al content of a plating bath, in wt %,
f = specific gravity f a steel sheet to be plated, and
G = specific gravity of a plating bath, and with a provision that the thickness of an alloyed layer containing Al and Fe formed on the steel sheet surface during the Al- or Al-alloy-plating is controlled to a thickness of 10 $\mu$m or less, cold rolling the Al- or Al-alloy-plated sheet to a rolled thickness of 0.1 mm or less, working the rolled sheet to a body of a required form, and heat-treating the body.

Another feature of the present invention is a process for producing a catalytic component comprising the steps of:

preparing a steel sheet containing;
0.1 wt % or less C,
2.0 wt % or less Si,
2.0 wt % or less Mn,
9.0 to 25.0 wt % Cr,
0.01 to 6.0 wt % Al, and
the balance consisting of Fe and unavoidable impurities, plating the steel sheet with Ni at an amount of from 0.3 to 10.0 g/m² in terms of the plated amount for each side of the steel sheet, plating the Ni-plated sheet by hot dipping with Al or Al-alloy at a plated amount defined by the following formula;

$$\text{amount plated by hot dipping } (\mu m, \text{ for one side}) > T \times \frac{f\left(\frac{1780}{t} - Crb - 2a\right)}{G\left(4b + 2Crm - \frac{3560}{t}\right)},$$

where
T = thickness of a steel sheet to be plated, in $\mu$m,
t = thickness of a foil to be rolled from a plated sheet, in $\mu$m,
Crb = Cr content of a steel sheet to be plated, in wt %,
Crm = Cr content of a plating bath, in wt %,
a = Al content of a steel sheet to be plated, in wt %,
b = Al content of a plating bath, in wt %,
f = specific gravity of a steel sheet to be plated, and
G = specific gravity of a plating bath, and with a provision that the thickness of an alloyed layer containing Al and Fe formed on the steel sheet surface during the Al- or Al-alloy-plating is controlled to a thickness of 10 $\mu$m or less, cold rolling the Al- or Al-alloy-plated sheet to a rolled thickness of 0.1 mm or less, working the rolled sheet to a body of a required form, heat-treating the body in a non-oxidizing atmosphere to obtain a metallic catalyst-carrier, forming on the surface of the metallic catalyst-carrier a wash-coat layer of a refractory metal oxide having a high specific surface area and a catalyst layer.

In the process according to the present invention, a steel sheet to be plated preferably further contains at least one of the following members (A) to (D);

(A) at least one of Ti, Zr, Nb, and Hf at a total amount of 2.0 wt % or less, (B) at least one of Mg, Ca, and Ba at a total amount of 0.01 wt % or less, (C) at least one of Y and rare earth elements at a total amount of 0.5 wt % or less, and (D) at least one of Mo and W at a total amount of 5 wt % or less.

In the processes according to the present invention, the plated amount of Ni for each side of said steel sheet is preferably 0.3 to 5.0 g/m²; the thickness of an alloyed layer containing Al and Fe is preferably controlled to a thickness of 7 $\mu$m or less; the amount plated by hot dipping is preferably specified by the following formula, $$\frac{Tf(26 - a)}{2.43(a + b + 26)} >$$

$$\text{amount plated by hot dipping } (\mu m, \text{ for one side}) > T \times \frac{f\left(\frac{1780}{t} - Crb - 2a\right)}{G\left(4b - \frac{3560}{t}\right)},$$

and the body of a required form heat-treated in a non-oxidizing atmosphere is preferably further heat-treated in an oxidizing atmosphere to obtain a metallic catalyst-carrier.

DESCRIPTION OF THE PREFERRED EMBODIMENTS

The present invention will be described further in detail below.

The catalyst carrier for the automobile exhaust gas purification must have a sufficient resistance to oxidation for a long term exposure to hot exhaust emissions as an assembly of metallic foils as thin as several tens of microns. Generally, a foil for a metallic catalyst-carrier, even if made of a heat-resisting stainless steel, must contain Cr and Al in an amount greater than those otherwise required, because such a several tens of microns thick foil has small Cr and Al amounts in terms of an absolute amount, and thus has a lowered resistance to oxidation.

Figure 1:
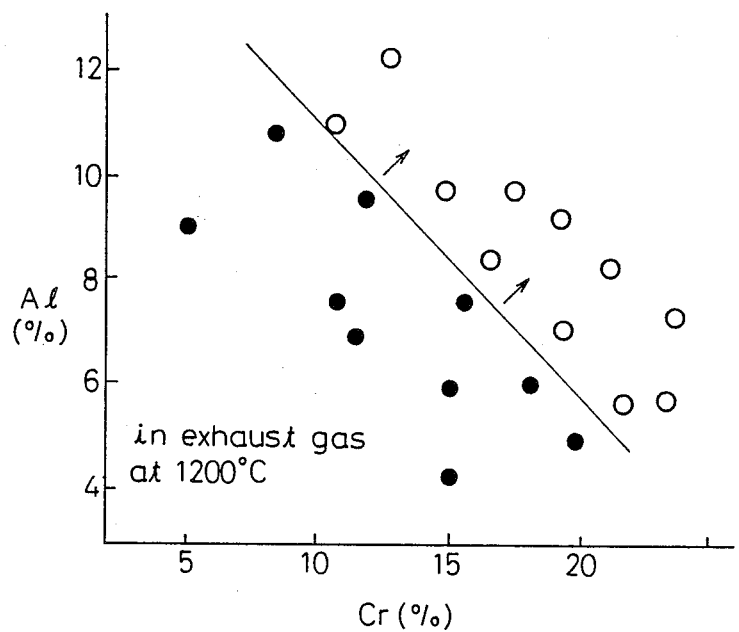
FIG. 1 shows a relationship between the Cr and the Al contents of a steel sheet and the resistance to oxidation.

The present inventors have evaluated the resistance to oxidation in an automobile exhaust gas of 50 μm thick stainless steel foils having various Cr and Al contents and prepared by small-size melting and cold rolling. FIG. 1 shows the relationship between the Cr and the Al contents of these foils and the oxidation resistance thereof in an exhaust gas having a temperature of 1200° C. In the Figure, the solid circles correspond to the foil compositions in which abnormal oxidation has occurred in 70 hours and the blank circles correspond to the compositions of the foils normally oxidized by the 70 hour exposure. This test in the exhaust gas at 1200° C. for 70 hours is an accelerated test but can properly evaluate the oxidation resistance of metallic catalyst-carrier in the actual automobile exhaust emissions. That is, the present inventors have trial-manufactured metallic catalyst-carriers from 50 μm foils of several compositions and subjected those foils to various engine bench tests at a maximum duration of 1000 hours. These tests have proved that foils having the normally oxidization compositions in the above accelerated tests passed each of the bench tests, but foils having the abnormally oxidization compositions malfunctioned due to a lack of oxidation resistance during at least one of the bench tests.

The evaluation in FIG. 1 represents the oxidation characteristics of the 50 μm foils. As previously described, the oxidation resistance of a foil depends on the absolute amounts of Cr and Al contained therein. Therefore, to provide a 40 μm thick foil with an oxidation resistance comparable with that of a 50 μm thick foil, the contents (concentrations) of Cr and Al must be 20% higher. The required Cr and Al contents, in wt %, for a metallic catalyst-carrier can be expressed in terms of the foil thickness t, in μm, considering FIG. 1 and the effect of the foil thickness as, $$(2Al + Cr)\frac{t}{50} > 32. \quad (A)$$

To satisfy this relationship for 20 to 80 μm thick foils, considerably high contents of Cr and Ar are required. But, a foil having such high Cr and Al contents cannot be practically mass-produced through a large scale melting and rolling process, although it can be melted and rolled on a small scale. To produce a foil having sufficient Cr and Al contents for maintaining a long term oxidation resistance sufficient for a metallic catalyst-carrier, the present inventors found that, if a steel sheet to be plated containing Cr and Al in amounts which allow a large scale melting and rolling (Cr≧9 wt %) is pre-plated with Ni at a plated Ni amount of from 0.3 to 10.0 g/m² (for each side of the steel sheet) and then plated with Al, no exfoliation of the plated Al layer occurs during rolling of the thus plated steel sheet, due to the good adhesivity of the plated Al layer, and the thickness ratio between the plated Al layer and the steel sheet does not substantially vary during rolling. It was also found that, when the rolled foil is heat-treated in a non-oxidizing atmosphere, the plated Al is diffused and dissolved in the steel foil without forming the Fe-Al intermetallic compounds which arise in the case of an Al-plating of common steels In a ferritic stainless steel containing 9 wt % or more Cr, Fe₃Al type intermetallic compounds cannot exist, and almost all of the plated amount of Al dissolves in the steel matrix to eliminate the exfoliation of the plated Al layer induced by such intermetallic compounds present in common steels, the dissolved Al effectively maintains the oxidation resistance of steel, a heavily irregular surface (hereinafter referred to as "rough surface layer") is obtained, as observed on an ordinary Al-plated material after heat treatment, and this roughness ensures a good carryability of the wash-coat layer of active alumina, zirconia, titania or other refractory metal oxide having a large specific surface area and directly carrying a catalyst, as well as the carryability of the catalyst layer.

To control the total amount of the Al and the Cr contents of a steel sheet to be plated and the Al content of the plated layer, and to ensure the workability and the heat resistance, the required plated amount for Al- or Al-alloy-plating by hot dipping is calculated based on the relationship (A) and the above-described findings, as follows:

$$\text{amount plated by hot dipping (μm, for one side)} > T \times \frac{f\left(\frac{1780}{t} - Crb - 2a\right)}{G\left(4b + 2Crm - \frac{3560}{t}\right)},$$

where
T = thickness of a steel sheet to be plated, in μm,
t = thickness of a foil to be rolled from a plated sheet, in μm,
Crb = Cr content of a steel sheet to be plated, in wt %,
Crm = Cr content of a plating bath, in wt %,
a = Al content of a steel sheet to be plated, in wt %,
b = Al content of a plating bath, in wt %,
f = specific gravity of a steel sheet to be plated, and
G = specific gravity of a plating bath.

The amount plated by hot dipping is preferably controlled as specified by the following formula;

$$\frac{Tf(26-a)}{2.43(a+b-26)} >$$

amount plated by hot dipping (μm, > for one side) $> T \times \dfrac{f\left(\dfrac{1780}{t} - Crb - 2a\right)}{G\left(4b - \dfrac{3560}{t}\right)}$ .

The left side of this expression is specified to control the amount plated by hot dipping, to suppress the Al content after heat treatment for diffusion to wt % or less, when an Al content after diffusion exceeding 26 wt % might cause the FeAl type intermetallic compounds to arise and deteriorate the foil property When the right side of the above-expressions has a value of 5 μm or less, amount plated by hot dipping is controlled to at least 5 μm.

The non-oxidizing atmosphere may be suitably established in a vacuum, Ar or other inactive gas, $N_2$, $N_2$-$H_2$, etc.

According to the present invention, a steel sheet of a specific composition containing Cr and Al basic elements is used. The reason for limiting the contents of the steel sheet will be described below.

Carbon is unavoidably contained in a steel sheet and impairs the toughness, ductility, and oxidation resistance thereof Therefore, preferably the C content is kept as low as possible. The damage usually caused by carbon is minimal when carbon is present in an amount of 0.1 wt % or less.

Silicon is also unavoidably contained in the steel sheet and impairs the toughness and ductility. Although silicon generally enhances the oxidation resistance, when the oxidation resistance is provided by the presence of $Al_2O_3$ as a metallic catalyst-carrier according to the present invention, a high Si content will impair the adhesivity of $Al_2O_3$ coating. Therefore, preferably the Si content is kept as low as possible. The damage usually caused by silicon is minimal when silicon is present in an amount of 2 wt % or less.

Manganese is also unavoidably contained in a steel sheet and impairs the oxidation resistance when present in an amount exceeding 2 wt %. On the other hand, Mn improves the plating property of a steel sheet and is preferably present in the range of 0.5 to 1.0 wt %.

Chromium is a positive additive for dissolving the plated Al into the steel matrix during a heat treatment after the Al-plating, without forming the $Fe_3Al$ type intermetallic compounds, and for stabilizing the $Al_2O_3$ coating to improve the oxidation resistance. This effect is significant when the Cr content is 9 wt % or more. Note, when Cr is present in an amount exceeding 25 wt %, a steel sheet is embrittled and cannot be successfully cold rolled and worked.

Aluminum decreases the oxygen level during the steel melting operation and promotes the desulphurization reaction to enhance the purity and improve the toughness and ductility of a steel sheet. Therefore, Al is added so as to be retained in an amount of at least 0.1 wt %. Particularly in the present invention, Al contained in a steel sheet promotes the diffusion of the plated Al into the steel sheet. To ensure this effect, Al is preferably present in an amount of 0.5 wt % or more. Note, an Al content exceeding 6 wt % embrittles a steel sheet, which then cannot be successfully cold rolled and worked. Therefore, preferably a steel sheet contains 3.5 wt % or more Al, to ensure a required oxidation resistance at minute unplated portions remaining after the Al-plating by hot dipping.

Ti, Zr, Nb, and Hf fix the C and N in the crystal grains and substantially purify the steel matrix to improve the workability, as well as stabilize the $Al_2O_3$ coating to enhance the oxidation resistance. But, if the total amount of these elements exceeds 2 wt %, an increased precipitation of intermetallic compounds occurs and causes embrittlement of the steel sheet. Therefore the upper limit of the total amount of Ti, Zr, Nb, and Hf is specified at 2 wt %.

Mg, Ca, and Ba are strong de-oxidizers and lower the oxygen level during the steel melting process, as well as directly participating in the desulphurization reaction to improve the toughness, ductility, and oxidation resistance of the steel sheet. But, if the total amount of these elements exceeds 0.01 wt %, the toughness of the steel sheet is impaired, and therefore, the upper limit of the total amount of the elements is 0.01 wt %.

Y and rare earth elements have an effect similar to Mg, Ca, and Ba, in particular fix S in the crystal grains to eliminate the harmful effect of S on the oxidation resistance, promote a diffusion of Cr and Al to improve the adhesivity of the $Al_2O_3$ coating, and contribute to other improvements in the oxidation resistance. But, if the total amount of Y and rare earth elements exceeds 0.5 wt %, an increased precipitation of intermetallic compounds is caused, with a resulting intense embrittlement of the steel sheet. Therefore, the upper limit of the total mount of Y and rare earth elements is 0.5 wt %.

Both Mo and W effectively improve the high temperature strength of a steel sheet, but if a total amount of Mo and W exceeds 5 wt %, no further increase of the effect can be expected but only an increase in the amount of various precipitates with a resulting embrittlement. Therefore, the upper limit of the total amount of Mo and W is 5 wt %.

To plate the above-described steel sheet with Al or Al alloy, any hot dipping type plating may be used. Preferably the Senzimir process is used for mass-production, which process comprises heating in a non-oxidizing furnace (NOF), heating in a reducing furnace (RF), and hot dipping in a molten Al bath. The Al-plating by hot dipping is usually difficult, since Al is easily oxidized, and Al contained in a steel sheet is easily oxidized but cannot be reduced by a usual plating process. Therefore, according to the present invention, a steel sheet is plated with Ni as a pre-treatment to the Al-plating.

Figure 2:
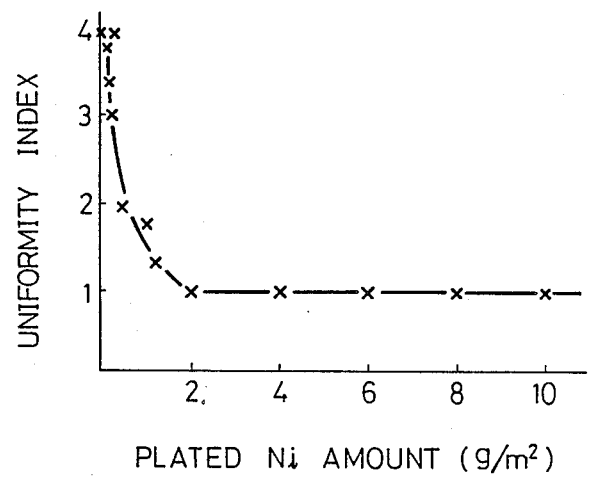
FIG. 2 shows a relationship between the pre-plated Ni amount and the uniformity of an Al-plated layer formed thereon by hot dipping.

FIG. 2 shows the relationship between the pre-plated Ni amount and the uniformity of Al-plated layer formed on the Ni-plated layer by hot dipping. The plated Ni amount for one side of the steel sheet is 0.3 to 10.0 g/m² in the present invention. Although, in the region between the plated Ni amounts of 0.3 and 2.0 g/m², some minute unplated portions are present, this can be ignored in practice, since the subsequent heat treatment for diffusion of the Al-plated layer unifies the foil composition. A minimum amount of 0.3 g/m² is required for a successful plating of Al on a steel sheet, and the maximum amount is 10.0 g/m², since an amount exceeding this value provides no further increase of the effect of the Ni-plated layer but merely increases the cost. From this viewpoint, the upper limit is preferably 5.0 g/m², and the most preferable range for the plated Ni amount is 0.5 to 2.0 g/m². The surface of an Al-containing steel sheet is easily oxidized and it is very difficult to reduce the oxidized surface layer in a reducing furnace. Therefore, unplated portions exist in a usual plating process without the pre-plating with Ni, and thus the Ni-plating prior to the Al-plating is necessary to prevent such unplated portions. Ni is easily reduced to allow a complete plating with Al on a steel sheet, promotes an interdiffusion between Al and steel plated with Al in the later heat treatment in a non-oxidizing atmosphere, and finally dissolves in the steel sheet. The Ni amount is lower than the solubility limit thereof in steel to prevent a precipitation of Ni-Al intermetallic compounds, which are detrimental to rolling.

The amount of an alloyed layer containing Al and Fe formed on the steel sheet surface during the Al- or Al-alloy-plating by hot dipping must be kept lower than a certain value, to prevent exfoliation of the plated layer during the subsequent rolling step and the working step for forming a metallic catalyst-carrier. Even when a flux is used for the Al-hot dipping plating, the Ni-plating must be used to obtain a complete coating of Al. When the Al coating is incomplete, oxidation proceeds during use as a metallic catalyst-carrier, with a resulting lack of gas flow, and the desired function cannot be accomplished. Particularly, such unplated portions are fatal defects when a metallic catalyst-carrier is incorporated in a final product of a honeycomb structure. That is, oxidation of the unplated portions further proceeds, to cause turbulence at portions with a resulting increased amount of oxidized material, thus blocking the gas flow passages. Therefore, unplated portions must be completely removed.

Figure 3:
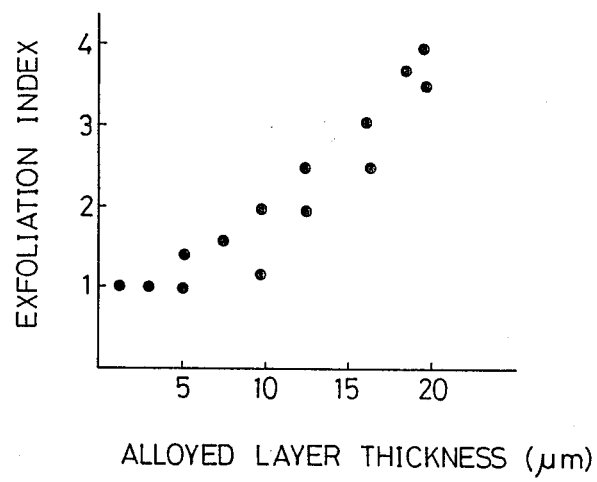
FIG. 3 shows a relationship between the thickness of an alloyed layer formed on a steel sheet during the Al-plating by hot dipping and the degree of exfoliation of the plated coating upon cold rolling.
Figure 4A:
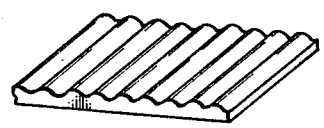
FIG. 4 shows examples of the form worked from a plated and cold rolled steel foil, where (b) and (d) correspond to (a) and (c) respectively.
Figure 4B:
Figure 4C:
Figure 4D:

The growth of an alloyed layer containing Al and Fe (hereinafter referred to as "Al—Fe alloy layer" or "alloyed layer") must be controlled to prevent exfoliation of the Al plated layer while rolling the Al plated steel sheet into a foil. FIG. 3 shows the relationship between the alloyed layer thickness and the exfoliation during rolling into a foil. The alloyed 1 layer thickness must be suppressed to 10 μm or less for one side of the steel sheet, to prevent exfoliation of the plated layer and to obtain a foil completely coated with Al or Al alloy. The alloyed layer thickness is preferably 7 μm or less, most preferably 2 to 3 μm. In most cases, hot dipping in a pure Al bath results in a growth of a very thick alloyed layer. For example, in the aforementioned NOF—RF plating process, a 10 second plating time results in an alloyed layer thicker than 20 μm.

Therefore, the plating bath temperature and the dipping time must be properly controlled to suppress the growth of alloyed layer. An addition of about 10% Si to an Al bath allows an easy control of the alloyed layer growth to a thickness of 10 μm or less. A lower amount of Si addition is preferable, as long as the alloyed layer growth can be effectively suppressed, and a 7 to 15% Si addition is generally preferred. Other than Si, the addition of Cu, Be, etc., to the plating bath can also suppress the alloyed layer growth, but Si has the most remarkable effect.

In the present invention, the plated coating has an Al-based composition including pure Al and Al alloy. As the Al alloy composition, an alloy of Al added with metals suppressing the alloyed layer growth as described above, and an alloy of Al added with Mg and/or metals suppressing the alloyed layer growth may be used.

Figure 5:
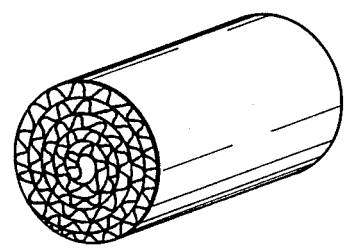
FIG. 5 shows a metallic catalyst-carrier in the form of a honeycomb fabricated by winding a worked foil.

The thus Al- or Al-alloy-plated steel sheet is then rolled into a foil. The rolling into a foil may be performed in a usual manner. The plated coating must be uniform in order to allow rolling; a nonuniformly plated steel sheet must be pre-rolled to unify the plated layer. A steel sheet to be plated usually has a thickness of from 0.2 to 0.7 mm, and the plated sheet is usually rolled to a thickness of 100 μm or less, preferably 20 to 80 μm. To exhibit the maximum effect as a catalyst carrier, the rolled foil is worked into the form of a corrugated sheet as shown in FIG. 4, for example, which provides an increased surface area in contact with the exhaust gas. The corrugated sheet may be spirally wound into a honeycomb-structured metallic catalyst-carrier as shown in FIG. 5. For example, a corrugated foil and a flat foil can be laminated to each other and spirally wound into a honeycomb form assembly, which is then subjected to soldering at portions where the corrugated foil and the flat foil are in contact with each other to form a honeycomb structured metallic catalyst-carrier. This soldering is performed by applying a solder to the contact portions and then heating the assembly.

The thus obtained metallic catalyst-carrier is then heat-treated in a vacuum, Ar, He, H, H—N, or other nonoxidizing atmosphere, preferably at a temperature of from 500° to 1300° C. During this heat treatment, the plated Al diffuses almost throughout the foil thickness to compose an Fe—Cr—Al based solid solution without the formation of Fe—Al intermetallic compounds that occurs in a common steel plated with Al. Moreover, this heat treatment also results in a rough surface to which a wash-coat layer formed by the subsequent coating of active alumina or other refractory metal oxide having a high specific surface area and directly carrying a catalyst can be firmly attached. If this heat treatment for diffusion is performed in an oxidizing atmosphere, part of the Al is oxidized and less Al diffuses into the foil, also an abnormal oxidation may occur at the foil edges, which may result in other problems.

Figure 6:
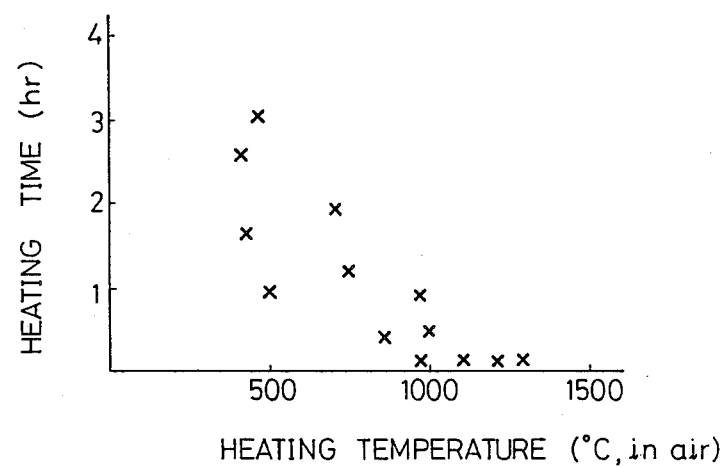
FIG. 6 shows a relationship between the temperature and the time for heat-treating a metallic catalyst-carrier.

The heat treatment for diffusion may simultaneously serve as a soldering process for fixing the honeycomb. The duration of the heat treatment intended only to diffuse Al is determined with respect to the treatment temperature and must be such that excessive Al is not retained in the surface layer. That is, the heating time must be varied depending on the Al adhesion, the initial steel sheet composition, and the reduction in rolling into a foil. FIG. 6 shows an example of the relationship between the temperature and the time for a foil produced by plating an Al—10% Si alloy at a plated amount of 40 μm for each side of a 0.4 mm thick 15 wt % Cr—4.5 wt % Al steel sheet and rolling the plated sheet into a 50 μm foil.

As described above, the heat treating in a non-oxidizing atmosphere ensures that the plated Al diffuses into the foil steel and that a rough surface is established on the foil surface of the metallic catalyst-carrier. A wash-coat layer of refractory metal oxide having a high specific surface area, such as active alumina, is formed on the metallic catalyst-carrier, in a usual manner, and a catalyst layer is formed on the wash-coat layer to obtain a catalytic component having an excellent high temperature durability for the purification of exhaust gases.

According to the above-described process, the heat treatment in a non-oxidizing atmosphere provides a rough surface on the metallic catalyst-carrier foil surface, to which a wash-coat layer and a catalyst layer can be firmly attached.

To further improve the carryability, according to another feature of the present invention, the above-mentioned heat treatment in a non-oxidizing atmosphere is followed by another heat treatment in an oxidizing atmosphere, such as air, for 3 to 10 hours to form a whisker-like or a flaky alumina on the foil.

The foils worked in a form such as a honeycomb are joined to each other or to an outer sleeve usually by soldering with Ni, which has a good solderability. Conventionally, the soldering causes a lowering of the Al amount at the soldered joint due to a diffusion of Al from the foil to the soldered Ni caused by the strong affinity between Ni and Al, with the result that the oxidation resistance of the foil is lowered and an abnormal oxidation may occur during service. According to the present invention, the foil worked into a form such as a honeycomb is rich in Al and an abnormal oxidation does not occur even at the soldered joint.

The present invention will be now described in more detail by way of examples.

EXAMPLE 1

Steel containing 0.004 wt % C, 0.23 wt % Si, 0.33 wt % Mn, 15.6 wt % Cr, 0.15 wt % Ti, 4.5 wt % Al and unavoidable impurities was continuous-cast, hot rolled, and cold rolled to a 0.4 mm thick steel sheet. After degreasing and pickling, the steel sheet was plated with Ni at a plated Ni amount of 2 g/m$^2$ for each side, and then plated with Al at a plated thickness of 45 $\mu$m for each side, by the Senzimir process using an Al—10% Si molten plating bath, and a 4 $\mu$m thick alloyed layer was formed. The plated sheet was cold rolled to a 50 $\mu$m thick foil, which was then worked into a honeycomb structure as shown in FIG. 5, and after soldering, heat-treated in a non-oxidizing atmosphere at 900° C. for 30 min, to obtain a metallic catalyst-carrier.

The metallic catalyst-carrier was subjected to a heat resistivity test in air at 1200° C. for 300 hours, and the results indicated a good heat resistance with no change of the carrier surface.

A catalytic component was produced by forming a layer of a platinum catalyst impregnated in $\gamma$-Al$_2$O$_3$ powder on the metallic catalyst-carrier. The catalytic component was then subjected to an automobile exhaust gas test at 800° to 1000° C. for 1000 hours, and the results indicated no abnormal oxidation or other problems.

EXAMPLE 2

Steel containing 0.006 wt % C, 0.21 wt % Si, 0.35 wt % Mn, 17.0 wt % Cr, 0.15 wt % Ti, 4.0 wt % Al and unavoidable impurities was continuous-cast, hot rolled, and cold rolled to a 0.3 mm thick steel sheet. After degreasing and pickling, the steel sheet was plated with Ni at a plated Ni amount of 1 g/m$^2$ for each side, and then plated with Al at a plated thickness of 30 $\mu$m for each side, by the Senzimir process using an Al—7% Si molten plating bath, and a 5 $\mu$m thick alloyed layer was formed. The plated sheet was cold rolled to a 45 $\mu$m thick foil, which was then worked into a honeycomb structure, and after soldering, heat-treated in a non-oxidizing atmosphere at 850° C. for 20 min, to obtain a metallic catalyst-carrier.

The metallic catalyst-carrier was subjected to a heat resistivity test in air at 1200° C. for 100 hours, and the results indicated a good heat resistance with no change of the carrier surface.

In a comparative sample of the same steel composition without the Al-plating, an abnormal oxidation occurred after 3 hours and the test was then stopped.

A catalytic component was produced by forming a wash-coat layer of a platinum catalyst impregnated in $\gamma$-Al$_2$O$_3$ powder on the metallic catalyst-carrier. The catalytic component was then subjected to an automobile exhaust gas test at 1200° C. for 100 hours, and the results indicated no abnormal oxidation or other problems.

EXAMPLE 3

Steel containing 0.006 wt % C, 0.24 wt % Si, 0.41 wt % Mn, 17.0 wt % Cr, 4.0 wt % Al and unavoidable impurities was continuous-cast, hot rolled, and cold rolled to a 0.3 mm thick steel sheet. After degreasing and pickling, the steel sheet was plated with Ni at a plated Ni amount of 1 g/m$^2$ for each side, and then plated with Al at a plated thickness of 30 $\mu$m for each side, by the Senzimir process using an Al—7% Si molten plating bath, and a 5 $\mu$m thick alloyed layer was formed. The plated sheet was cold rolled into a 45 $\mu$m thick foil, which was then worked into a honeycomb structure, and after soldering, heat-treated in a non-oxidizing atmosphere at 850° C. for 20 min, to obtain a metallic catalyst-carrier. The carrier was then heat treated in air at 900° C. for 5 hours to form an alumina coating layer thereon.

Active alumina powder, water, and aluminum nitrate were mixed and thoroughly stirred to form a slurry having a viscosity of 300 cps, which was poured from above into the honeycomb structure of the metallic catalyst-carrier, and an excess deposition of the slurry was blown away by compressed air. The honeycomb was then dried at 200° C. for 3 hours, heated at 700° C. for 2 hours to form a wash-coat layer of a 50 $\mu$m average thickness, and immersed in a dinitrodiammine platinum solution to form a platinum catalyst layer.

The thus obtained catalytic component was subjected to an automobile exhaust gas purification test for 1000 hours, and the results indicated no abnormal oxidation or other problems.

EXAMPLE 4

A metallic catalyst-carrier was produced in the same manner as in Example 1.

Active alumina powder, water, and aluminum nitrate were mixed and thoroughly stirred to form a slurry having a viscosity of 300 cps, which was poured from above into the honeycomb structure of the metallic catalyst-carrier and an excess deposition of the slurry was blown away by compressed air. The honeycomb was then dried at 200° C. for 3 hours, heated at 700° C. for 2 hours to form a wash-coat layer of a 50 $\mu$m average thickness, and immersed in a dintrodiammine-platinum solution and then in a rhodium chloride aqueous solution to carry 1.5 g/l Pt and 0.3 g/l Rh.

EXAMPLE 5

A metallic catalyst carrier was produced in the same manner as in Example 2 and a wash-coat layer was formed thereon in the same manner as in Example 3, followed by immersion in a mixed aqueous solution of cerium nitrate and lanthanum nitrate, drying at 200° C. for 3 hours, and heating at 600° C. for 2 hours to form a (Ce·La)O$_{2-x}$ complex oxide layer on the wash-coat layer. A further immersion in a mixed solution of palladium nitrate, dinitrodiammineplatinum, and rhodium nitrate was performed to obtain catalytic component carrying 1 g/l Pd, 0.5 g/l Pt, and 0.3 g/l Rh.

COMPARATIVE EXAMPLE

A steel containing 15 wt % Cr, 4 wt % Al, and a balance of Fe and unavoidable impurities was cold rolled into a 50 μm thick foil, worked until it had an increased area to be in contact with the exhaust gas as shown in FIG. 4, wound into a honeycomb structure metallic catalyst-carrier as shown in FIG. 5, and heat-treated at above 900° C. in air. On the thus obtained metallic catalyst carrier, aqueous alumina gel (alumina hydrate) and then aqueous alumina gel containing γ-alumina suspended therein were applied to form a wash-coat layer. In the same manner as in Examples 4 and 5, a catalyst layer was formed on the wash-coat layer to obtain comparative samples 1 and 2.

Samples from Examples 4 and 5 (samples 4 and 5) and the comparative samples 1 and 2 were subjected to the following comparison test.

The catalytic components, 80 mm in dia, 100 mm in length, of samples 4, 5, 1, and 2 were mounted on the exhaust system of a 3000 cc-gasoline engine. A durability test was carried out for 300 hours, in which a cycle of 5 min at a catalyst bed temperature of 950° C. and 5 min at 150° C. was repeated. After the durability test, the engine was operated under the condition of 2000 rpm and −300 mmHq to evaluate the purification performance. Exfoliation of the wash-coat layer was observed by the naked eye and by microscopic examination, in which the wash-coat thickness was measured for ten points thereof to determine the exfoliation ratio.

The results are shown in Table 1.

TABLE 1

|  |  | Purification Rate (%) | | | Exfoliation Ratio (%) |
| --- | --- | --- | --- | --- | --- |
|  |  | HC | CO | NO$_x$ |  |
| Inventive | 4 | 86 | 82 | 91 | 2 |
| Sample | 5 | 84 | 81 | 88 | 3 |
| Comparative | 1 | 79 | 75 | 78 | 16 |
| Sample | 2 | 75 | 72 | 76 | 18 |

The above results show that the catalytic components according to the present invention have an improved durability with an extremely lowered exfoliation ratio, in comparison with the comparative samples.

As described above, a metallic catalyst-carrier and a catalytic component according to the present invention have an excellent oxidation resistance due to the high Al content of the foil. To produce a high Al foil, a relatively low Al steel sheet was used, to ensure an easy rolling and working thereof, and then Al-plating was carried out to enhance the Al content of the metallic catalyst carrier. The Al-plating was carried out with a good adhesivity of the plated Al layer to the base steel sheet and without significant unplated portions, with a resulting excellent oxidation resistance. The irregularities on the foil surface (rough surface layer) formed during the heat treatment in non-oxidizing atmosphere, and the additional irregularities on the alumina coating layer formed during the heat treatment in oxidizing atmosphere as well, provided an excellent carryability for a wash-coat layer and a catalyst layer.

The process according to the present invention provides a metallic catalyst-carrier and a catalytic component having an excellent oxidation resistance, anti-exfoliation property, and high temperature durability.

We claim:

1. A process for producing a metallic(catalyst-carrier,) comprising the steps of:
   preparing a steel sheet containing;
   0.1 wt % or less C,
   2.0 wt % or less Si,
   2.0 wt % or less Mn,
   9.0 to 25.0 wt % Cr,
   0.01 to 6.0 wt % Al, and
   the balance consisting of Fe and unavoidable impurities,
   plating the steel sheet with Ni at an amount of from 0.3 to 10.0 g/m² in terms of the plated amount for each side of the steel sheet,
   plating the Ni-plated sheet by hot dipping with Al or Al-alloy at a plated amount defined by the following formula;

$$\text{amount plated by hot dipping } (\mu m, \text{ for one side}) > T \times \frac{f\left(\frac{1780}{t} - Crb - 2a\right)}{G\left(4b + 2Crm - \frac{3560}{t}\right)},$$

where
T = thickness of a steel sheet to be plated, in μm,
t = thickness of a foil to be rolled from a plated sheet, in μm,
Crb = Cr content of a steel sheet to be plated, in wt %,
Crm = Cr content of a plating bath, in wt %,
a = Al content of a steel sheet to be plated, in wt %,
b = Al content of a plating bath, in wt %,
f = specific gravity of a steel sheet to be plated, and
G = specific gravity of a plating bath,
and with a provision that the thickness of an alloyed layer containing Al and Fe formed on the steel sheet surface during the Al- or Al-alloy-plating is controlled to a thickness of 10 μm or less,
   cold rolling the Al- or Al-alloy-plated sheet to a rolled thickness of 0.1 mm or less,
   working the rolled sheet to a body of a required form, and
   heat-treating the body.

2. A process according to claim 1, wherein said steel sheet further contains at least one of the following members (A) to (D);
   (A) at least one of Ti, Zr, Nb, and Hf at a total amount of 2.0 wt % or less,
   (B) at least one of Mg, Ca, and Ba at a total amount of 0.01 wt % or less,
   (C) at least one of Y and rare earth elements at a total amount of 0.5 wt % or less, and
   (D) at least one of Mo and W at a total amount of 5 wt % or less.

3. A process according to claim 1, wherein said plated amount of Ni for each side of said steel sheet is 0.3 to 5.0 g/m².

4. A process according to claim 1, wherein said thickness of an alloyed layer containing Al and Fe is controlled to a thickness of 7 μm or less.

5. A process according to any one of claims 1 to 4, wherein the amount plated by hot dipping is specified by the following formula;

$$\frac{Tf(26-a)}{2.43(a+b+26)} >$$

$$\text{amount plated by hot dipping } (\mu m, \text{ for one side}) > T \times \frac{f\left(\frac{1780}{t} - Crb - 2a\right)}{G\left(4b - \frac{3560}{t}\right)}.$$

6. A process according to claim 1, wherein said rolled sheet is worked into a corrugated sheet, laminated to another rolled but unworked flat sheet, and spirally wound into a honeycomb form assembly and then, prior to said heat-treating, a solder is applied to portions of the assembly at which the corrugated sheet and the flat sheet are in contact with each other.

7. A process for producing a component, comprising the steps of:
   preparing a steel sheet containing;
   0.1 wt % or less C,
   2.0 wt % or less Si,
   2.0 wt % or less Mn,
   9.0 to 25.0 wt % Cr,
   0.01 to 6.0 wt % Al, and
   the balance consisting of Fe and unavoidable impurities,
   plating the steel sheet with Ni at an amount of from 0.3 to 10.0 g/m² in terms of the plated amount for each side of the steel sheet,
   plating the Ni-plated sheet by hot dipping with Al or Al-alloy at a plated amount defined by the following formula; T $$\text{amount plated by hot dipping } (\mu m, \text{ for one side}) > T \times \frac{f\left(\frac{1780}{t} - Crb - 2a\right)}{G\left(4b + 2Crm - \frac{3560}{t}\right)},$$

where
   T = thickness of a steel sheet to be plated, in $\mu m$,
   t = thickness of a foil to be rolled from a plated sheet, in $\mu m$,
   Crb = Cr content of a steel sheet to be plated, in wt %,
   Crm = Cr content of a plating bath, in wt %,
   a = Al content of a steel sheet to be plated, in wt %,
   b = Al content of a plating bath, in wt %,
   f = specific gravity of a steel sheet to be plated, and
   G = specific gravity of a plating bath,
   and with a provision that the thickness of an alloyed layer containing Al and Fe formed on the steel sheet surface during the Al- or Al-alloy-plating is controlled to a thickness of 10 $\mu m$ or less,
   cold rolling the Al- or Al-alloy-plated sheet to a rolled thickness of 0.1 mm or less,
   working the rolled sheet to a body of a required form,
   heat-treating the body in a non-oxidizing atmosphere to obtain a metallic catalyst-carrier, and
   forming on the surface of the metallic catalyst-carrier a wash-coat layer of a refractory metal oxide having a high specific surface area and a catalyst layer.

8. A process according to claim 7, wherein said steel sheet further contains at least one of the following members (A) to (D);
   (A) at least one of Ti, Zr, Nb, and Hf at a total amount of 2.0 wt % or less,
   (B) at least one of Mg, Ca, and Ba at a total amount of 0.01 wt % or less,
   (C) at least one of Y and rare earth elements at a total amount of 0.5 wt % or less, and
   (D) at least one of Mo and W at a total amount of 5 wt % or less.

9. A process according to claim 7, wherein said plated amount of Ni for each side of said steel sheet is 0.3 to 5.0 g/m².

10. A process according to claim 7, wherein said thickness of an alloyed layer containing Al and Fe is controlled to a thickness of 7 $\mu m$ or less.

11. A process according to claim 7, wherein the amount plated by hot dipping is specified by the following formula;

$$\frac{Tf(26-a)}{2.43(a+b+26)} >$$

$$\text{amount plated by hot dipping } (\mu m, \text{ for one side}) > T \times \frac{f\left(\frac{1780}{t} - Crb - 2a\right)}{G\left(4b - \frac{3560}{t}\right)}.$$

12. A process according to any one of claims 7 to 11, wherein the body of a required form heat-treated in a non-oxidizing atmosphere is further heat-treated in an oxidizing atmosphere.

13. A process according to claim 7, wherein said rolled sheet is worked into a corrugated sheet, laminated to another rolled but unworked flat sheet, and spirally wound into a honeycomb form assembly and then, prior to said heat-treating, a solder is applied to portions of the assembly at which the corrugated sheet and the flat sheet ar in contact with each other.

* * * * *

UNITED STATES PATENT AND TRADEMARK OFFICE
CERTIFICATE OF CORRECTION

PATENT NO.  : 4,867,811

DATED       : September 19, 1989

INVENTOR(S) : H. Wakiyama, et al.

It is certified that error appears in the above-identified patent and that said Letters Patent is hereby corrected as shown below:

Column 3, line 38, change "gravity f a steel" to --gravity of a steel--.

Column 5, line 51, change "oxidization" to --oxidized--.

Column 5, line 53, change "oxidization" to --oxidized--.

Column 6, line 6, change "Ar" to --Al--.

Column 9, line 41, delete "l" between "alloyed" and "layer".

Column 14, line 26, insert comma after "um" and delete comma from line 27.

UNITED STATES PATENT AND TRADEMARK OFFICE
CERTIFICATE OF CORRECTION

PATENT NO. : 4,867,811

DATED : September 19, 1989

INVENTOR(S) : H. Wakiyama, et al.

It is certified that error appears in the above-identified patent and that said Letters Patent is hereby corrected as shown below:

Column 15, line 33, delete "T" after "formula;".

Column 15, line 42, insert comma after "um" and delete comma from line 43.

Signed and Sealed this

Sixth Day of November, 1990

Attest:

HARRY F. MANBECK, JR.

*Attesting Officer*  *Commissioner of Patents and Trademarks*